Oct. 14, 1924.

G. W. BEADLE 1,511,715

MACHINE FOR MAKING TUBULAR ARTICLES

Original Filed May 5, 1920    11 Sheets-Sheet 1

INVENTOR
G. W. Beadle
BY
Rogers, Kennedy Campbell
ATTORNEYS.

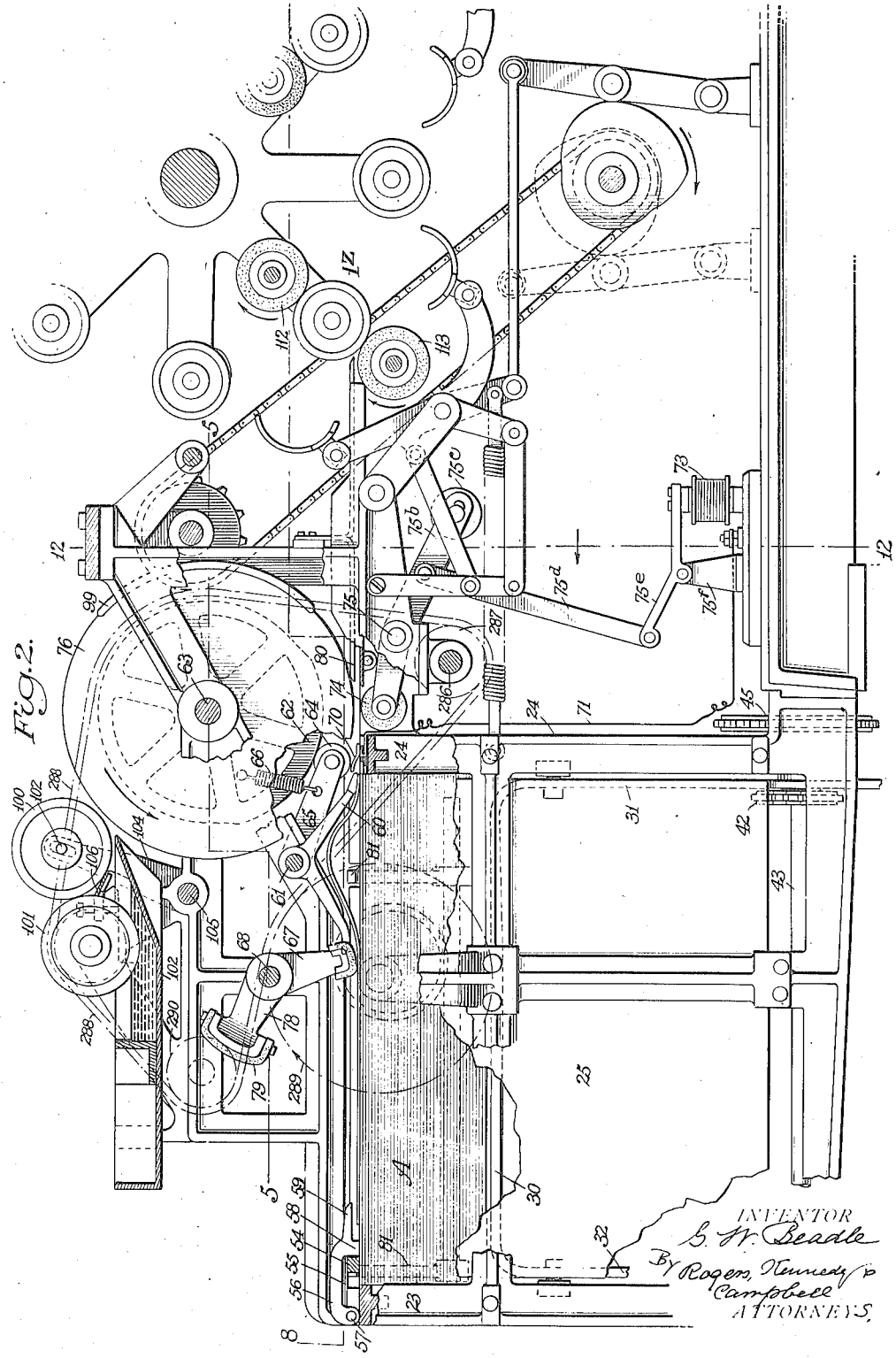

Oct. 14, 1924.                                                                         1,511,715
G. W. BEADLE
MACHINE FOR MAKING TUBULAR ARTICLES
Original Filed May 5, 1920    11 Sheets-Sheet 3
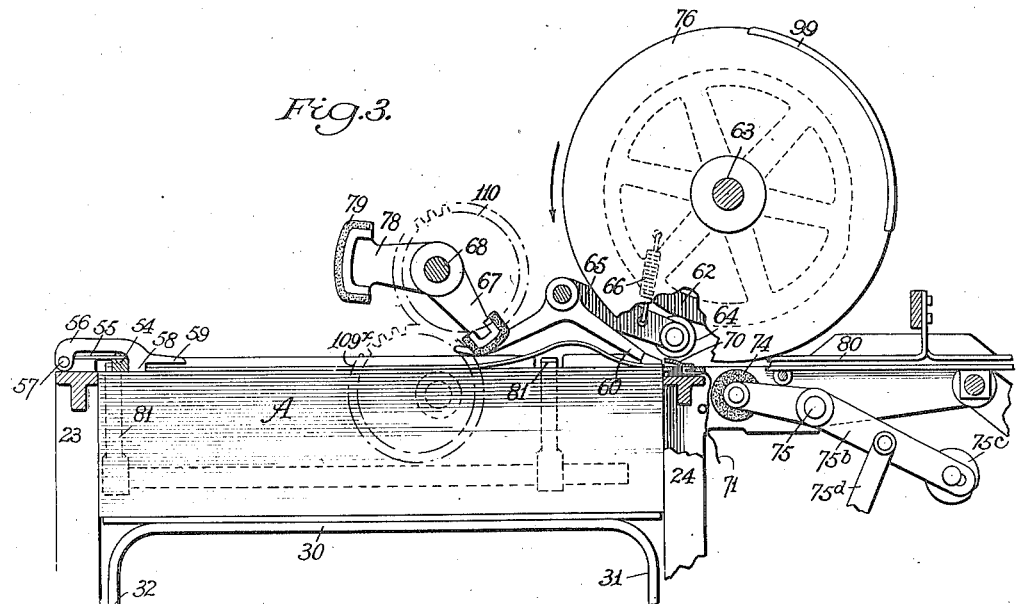
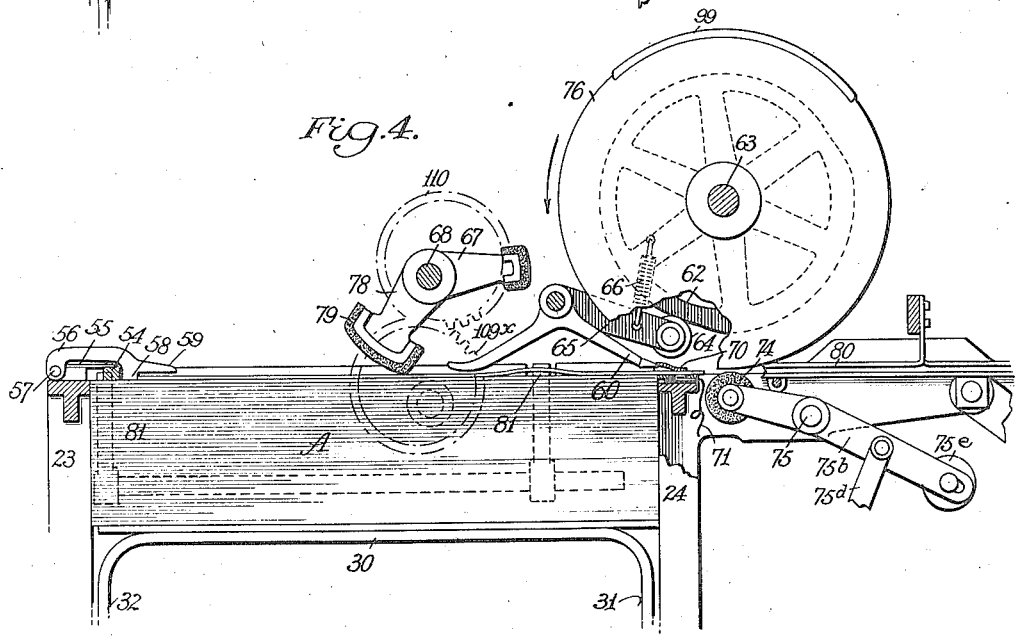

Oct. 14, 1924.
G. W. BEADLE
1,511,715
MACHINE FOR MAKING TUBULAR ARTICLES
Original Filed May 5, 1920  11 Sheets-Sheet 4
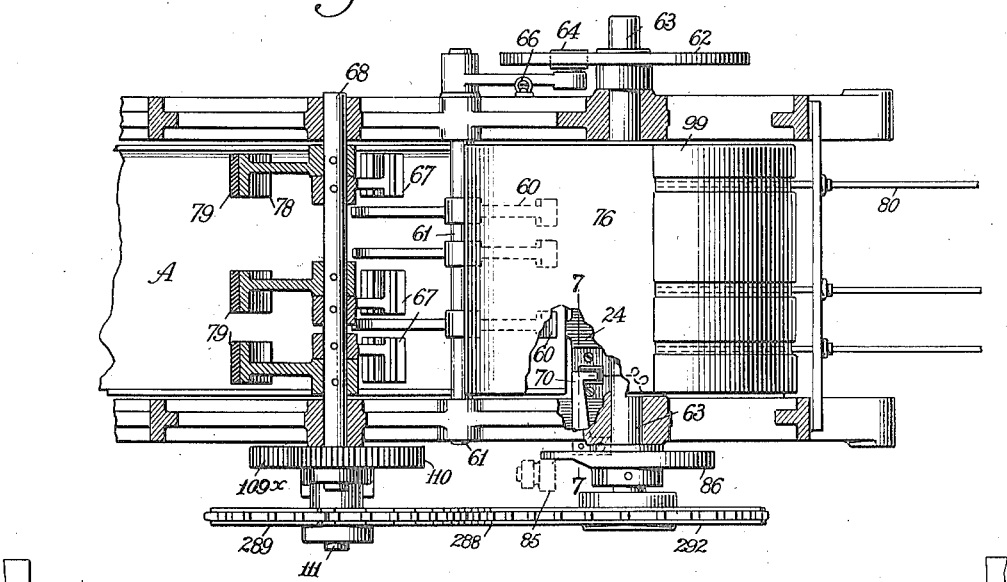
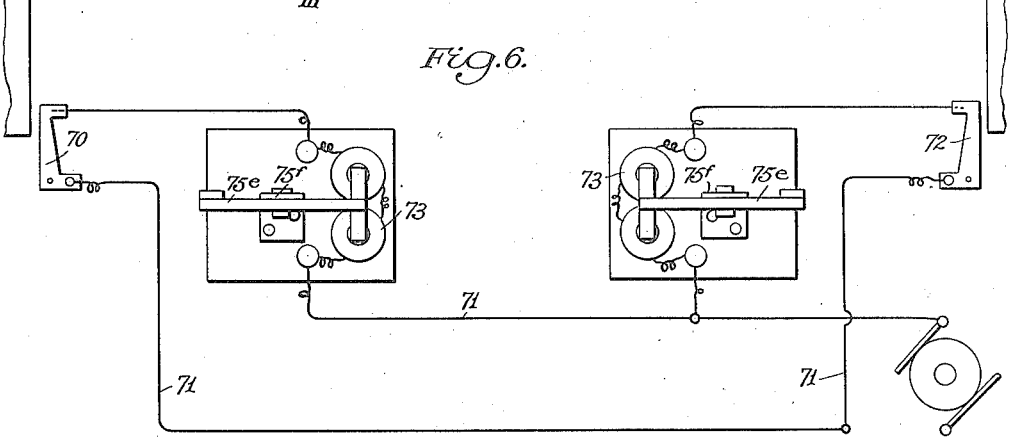
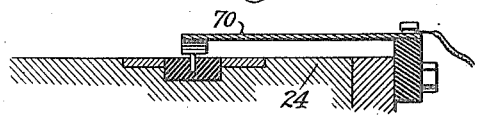
INVENTOR
G. W. Beadle
BY Rogers, Kennedy & Campbell
ATTORNEY

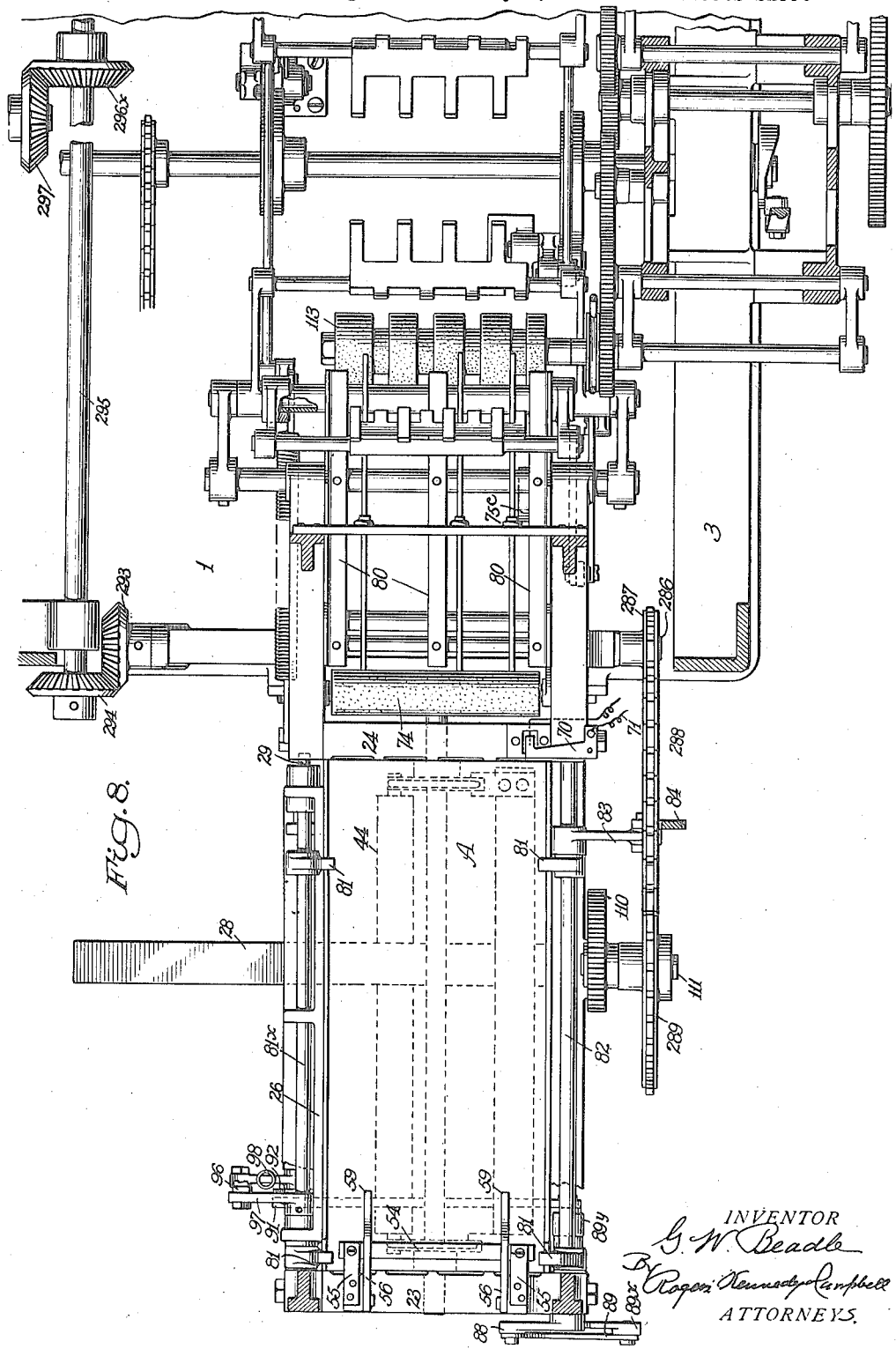

Oct. 14, 1924.

G. W. BEADLE 1,511,715

MACHINE FOR MAKING TUBULAR ARTICLES

Original Filed May 5, 1920  11 Sheets-Sheet 6

INVENTOR
G. W. Beadle
BY Rogers, Kennedy & Campbell
ATTORNEYS

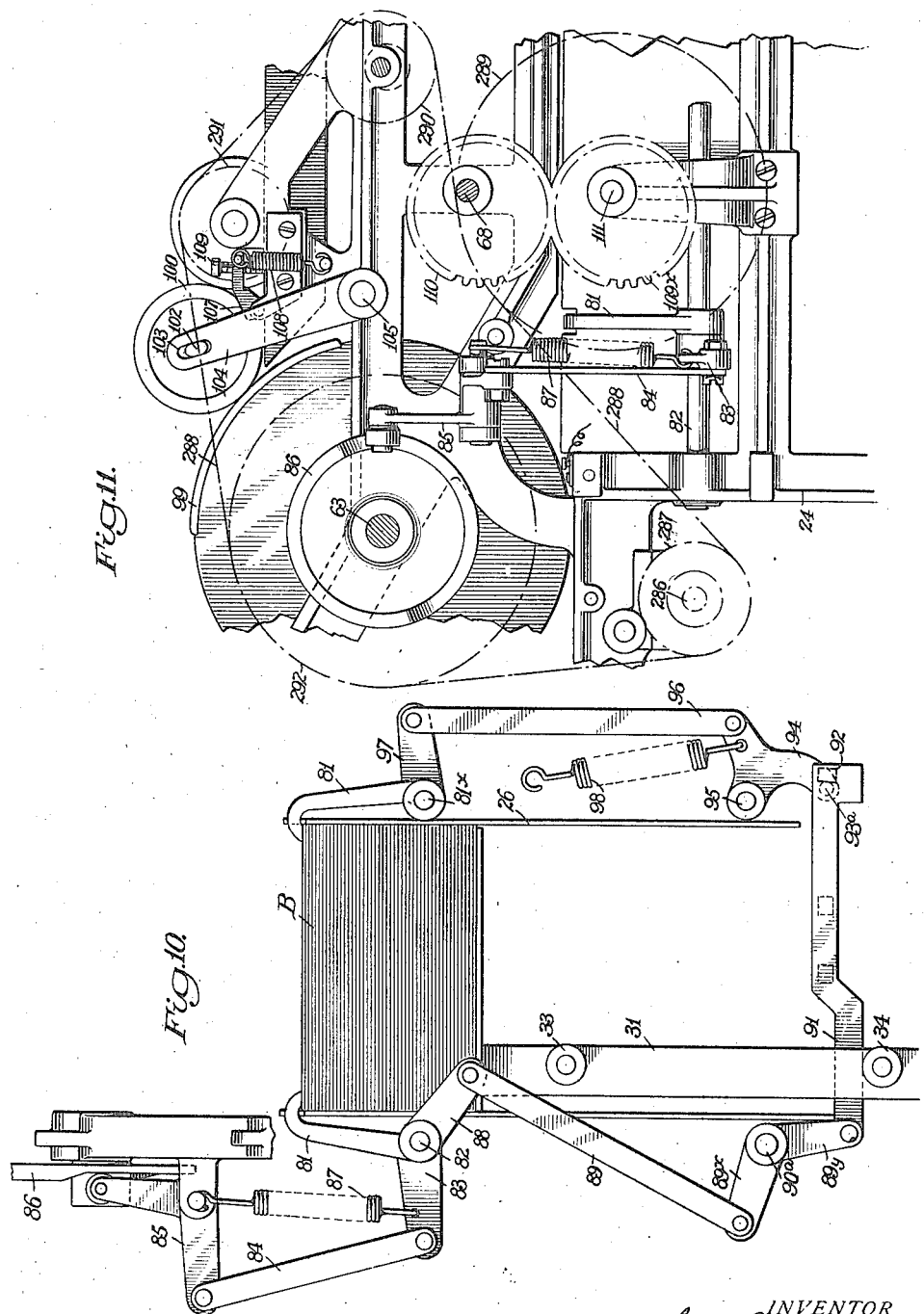

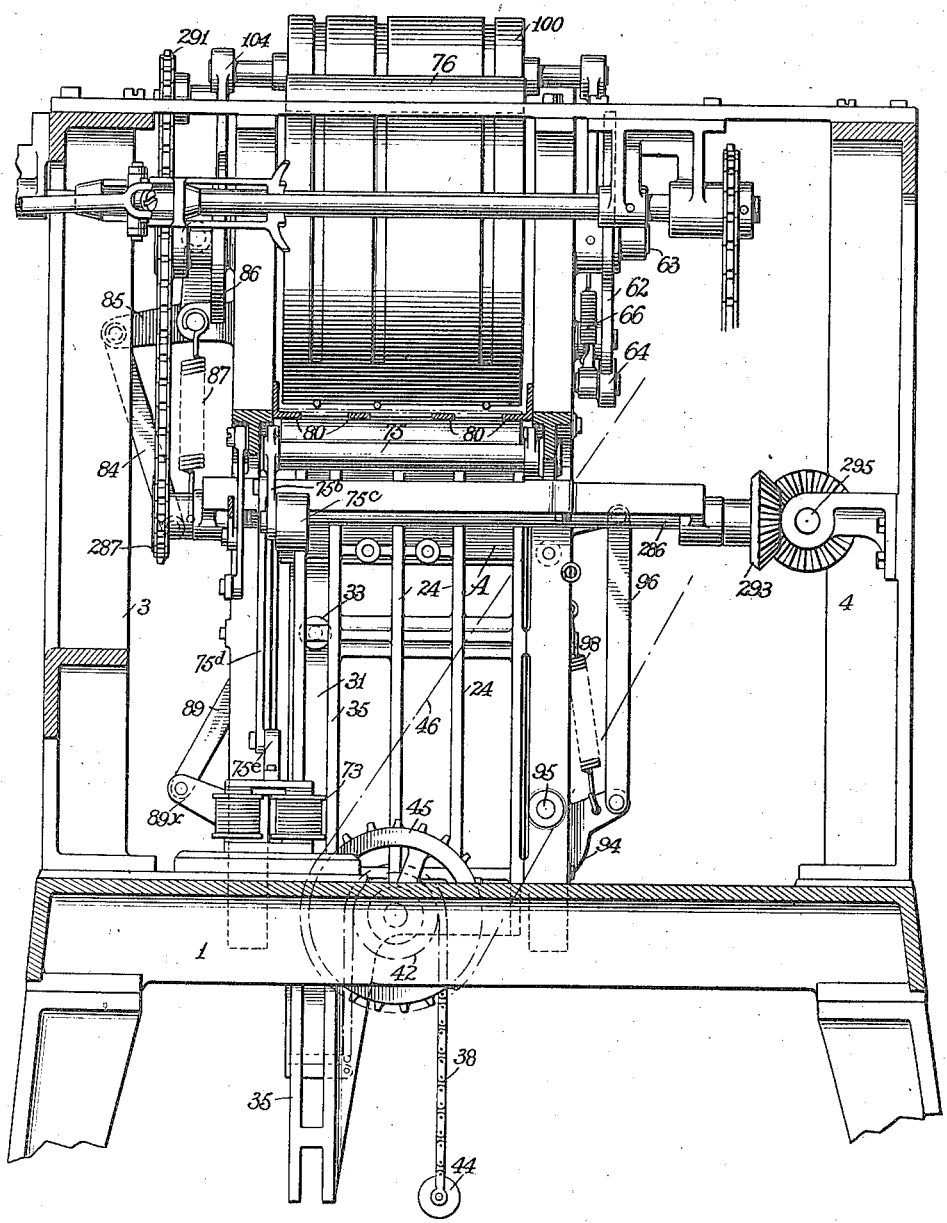

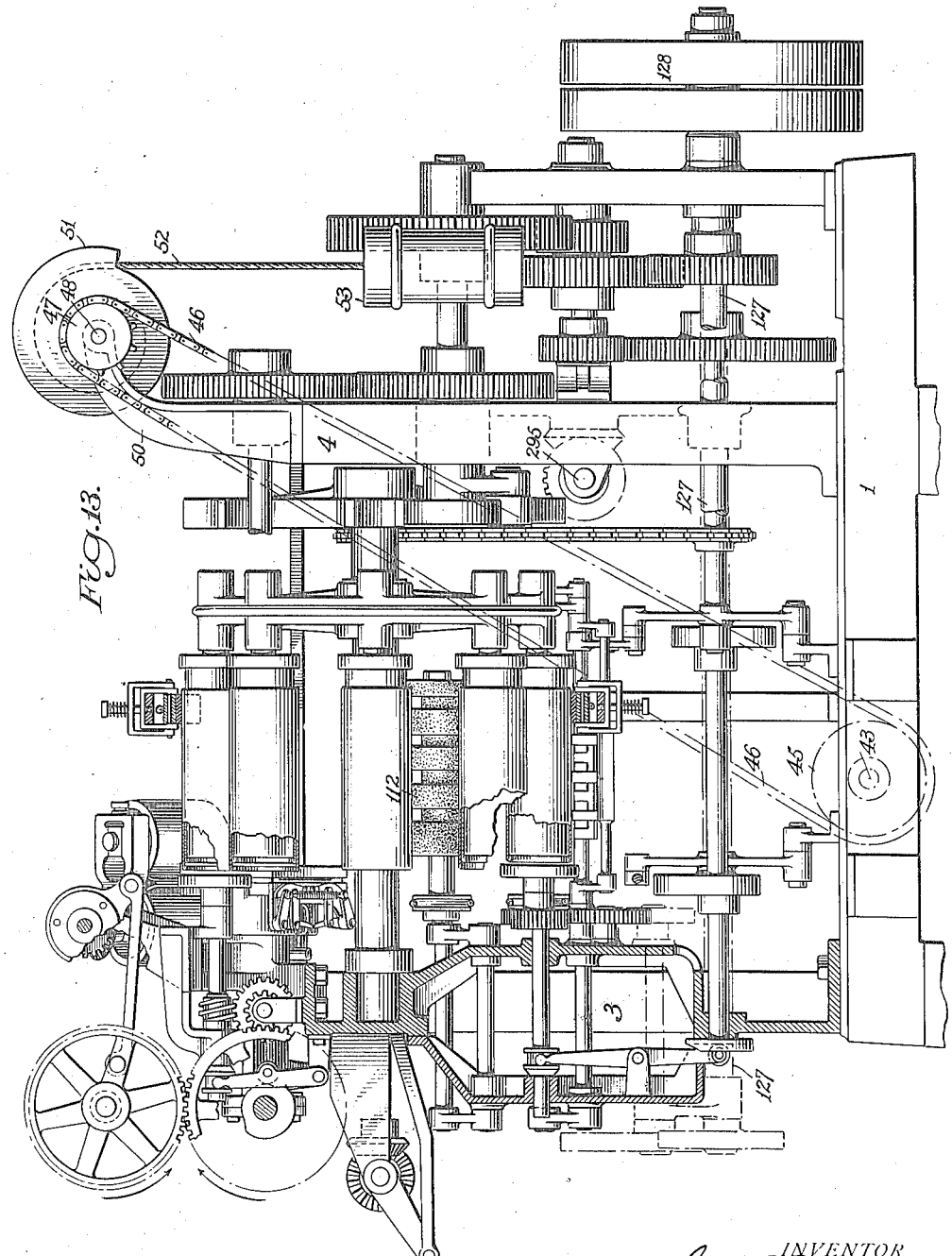

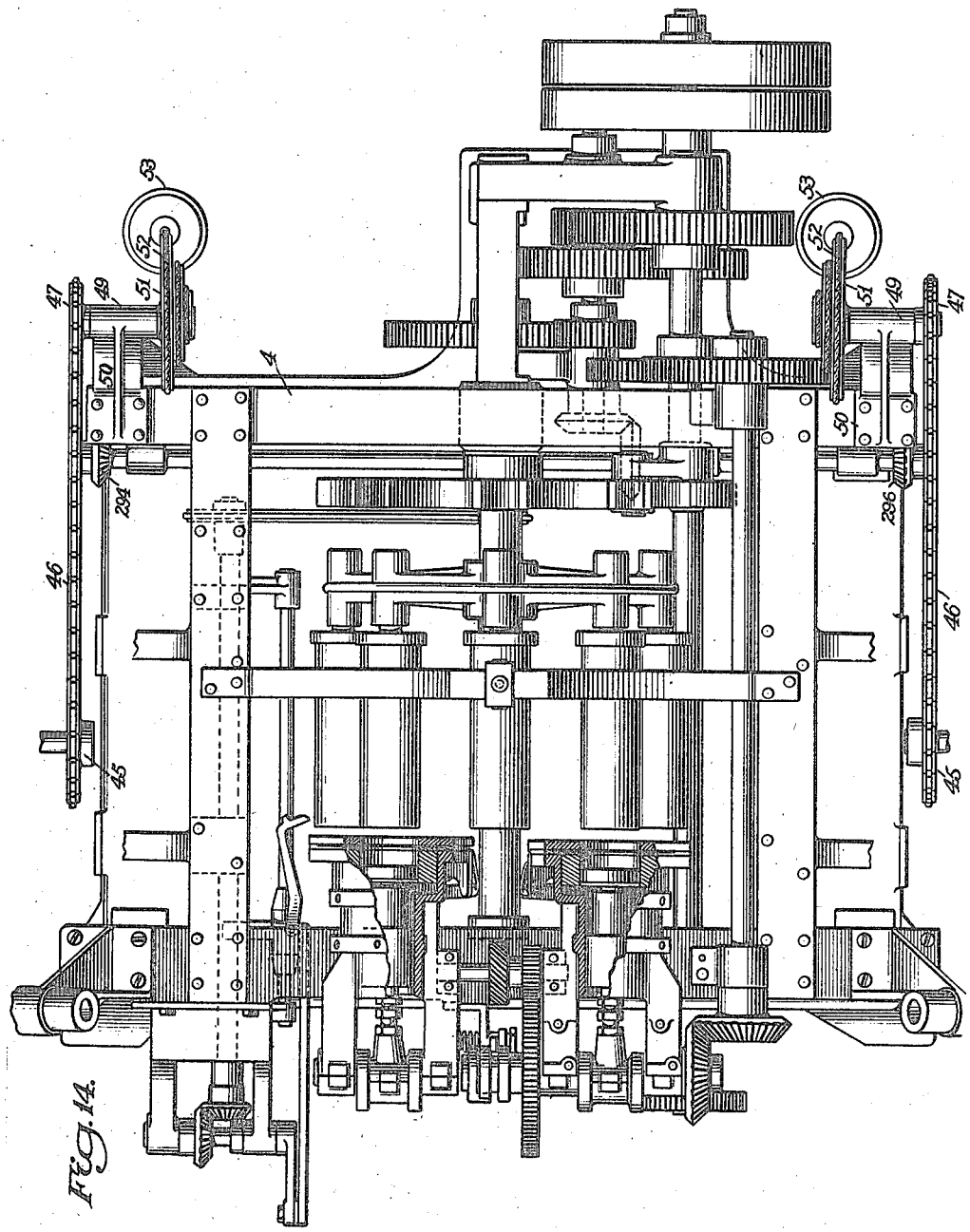

Oct. 14, 1924.

G. W. BEADLE 1,511,715

MACHINE FOR MAKING TUBULAR ARTICLES

Original Filed May 5, 1920    11 Sheets-Sheet 11

INVENTOR
G. W. Beadle
BY Rogers Kennedy
& Campbell
ATTORNEY

Patented Oct. 14, 1924.

1,511,715

UNITED STATES PATENT OFFICE.

GEORGE W. BEADLE, OF NEW YORK, N. Y., ASSIGNOR TO INTERNATIONAL PAPER COMPANY, A CORPORATION OF NEW YORK.

MACHINE FOR MAKING TUBULAR ARTICLES.

Original application filed May 5, 1920, Serial No. 378,993. Divided and this application filed September 24, 1921. Serial No. 502,980.

*To all whom it may concern:*

Be it known that I, GEORGE W. BEADLE, a citizen of the United States, residing at New York, in the county of New York and State of New York, have invented certain new and useful Improvements in Machines for Making Tubular Articles, of which the following is a specification, reference being had therein to the accompanying drawing, being a division of original application filed May 5, 1920, Serial No. 378,993.

This invention relates to means and mechanism for extracting blanks from a holder and feeding them to the action of forming means, and the invention is a division of an original application filed by me on the 5th day of May, 1920, Serial No. 378,993. In the machine of said application, a series of forming mandrels is mounted on a suitable carrier which is rotated step by step, so that the individual mandrels will be presented in succession to blank extracting and feeding mechanisms and to certain other mechanisms by whose combined operations a tubular receptacle or carton is formed made up of two blanks wound one around the other and furnished with a suitable bottom or closure at one end. The invention of the present application is directed to the blank holder and the mechanism associated therewith for extracting the blanks in succession and feeding them to the action of the winding or forming means and applying adhesive to the blanks to cause the convolutions of the same to be cemented together. These mechanisms will be fully described in the specification to follow, and the novel parts thereof will be set forth in the appended claims.

In the accompanying drawings:

Fig. 1 is a longitudinal sectional elevation of a machine for forming cartons, which machine is equipped with my improvements.

Fig. 2 is a side elevation on an enlarged scale partly in section through one end of the machine, with certain parts broken away.

Fig. 3 is a side elevation of one of the blank extracting and feeding mechanisms.

Fig. 4 is a view similar to Fig. 3 with the parts in a different position.

Fig. 5 is a horizontal sectional plan view on the line V—V of Fig. 2.

Fig. 6 is a diagram of the electric circuits controlling the action of the blank feeding mechanism.

Fig. 7 is a section on an enlarged scale on the line VII—VII of Fig 5 through the terminals of one of the circuits controlling the action of the blank feeding mechanisms.

Fig. 8 is a horizontal sectional plan view on the line VIII—VIII of Fig. 2.

Fig. 10 is a view similar to Fig. 9 with the end framing and other parts removed, and showing the blank confining fingers and the connections for operating them.

Fig. 11 is a side elevation of the parts shown in Fig. 5 as viewed in the direction of the arrow in said figure.

Fig. 12 is a vertical transverse section on the line XII—XII of Fig. 2 as viewed in the direction of the arrow cutting said line.

Fig. 13 is a section taken through the machine from front to rear to show a detail of the mechanism for urging the pile of blanks upwardly in the blank holder.

Figure 14:
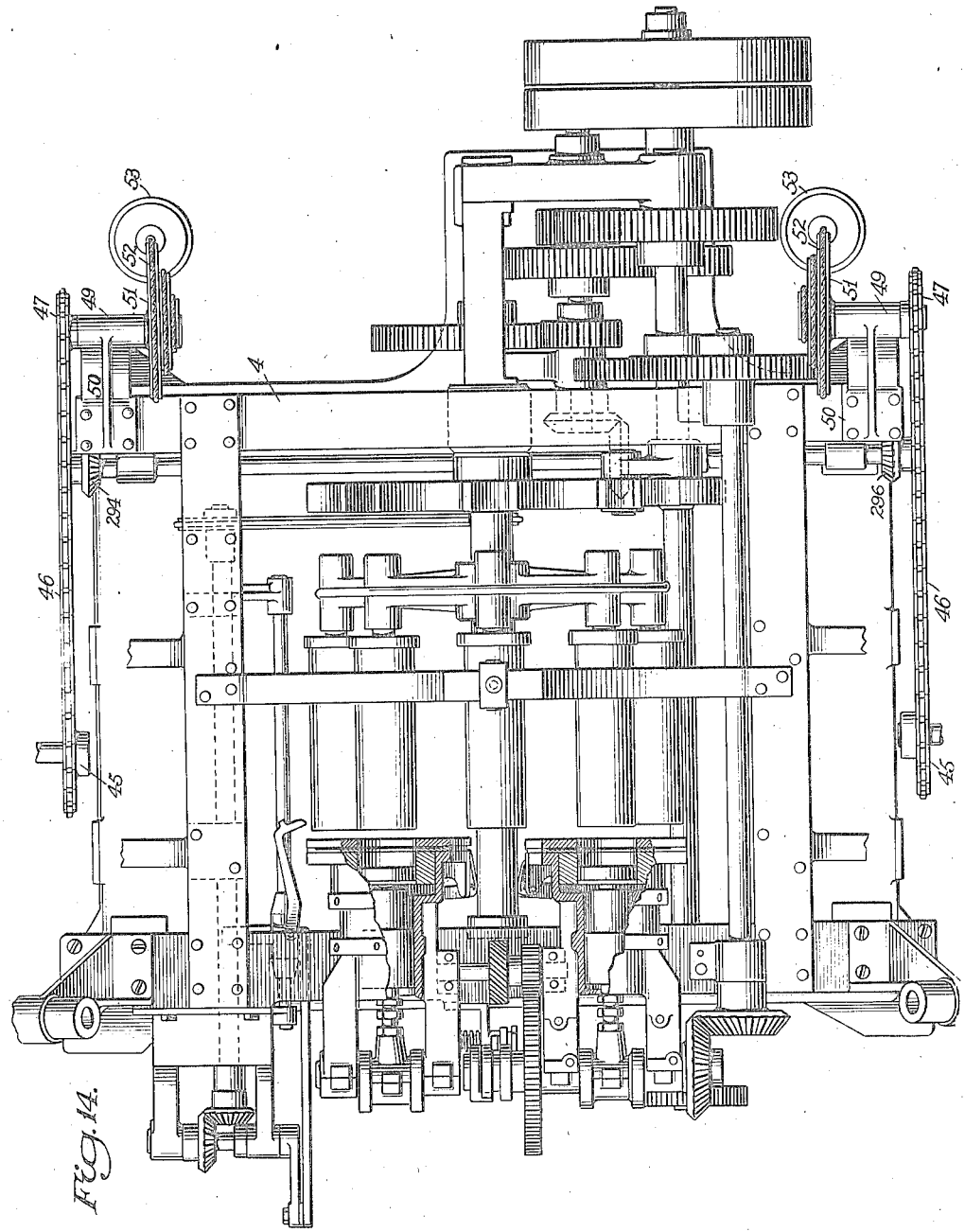
Fig. 14 is a top plan view of the parts shown in Fig. 13.

Referring to the drawings:

The operative parts of the machine are mounted in and sustained by a suitable frame, comprising in the present instance a base portion or bed plate sustained by suitable legs and front and rear open rectangular upright frame members 3 and 4 extending upwardly from the bed plate respectively at its front and rear.

The various mechanisms for operating on the blanks to form the same into cartons, are mounted between and sustained by the two upright frame members, and the two sets of blanks are fed into the machine from its opposite ends from the blank holders 5 and 6 by their associated blank extracting and blank feeding mechanisms, blank holder 5 being connected to and extending outwardly from one end of the base frame and being adapted to hold a pile of blanks A for the first winding, and the holder 6 being connected with and extending outwardly from the opposite end of the base plate and being adapted to hold a pile of blanks B for the second winding. The two blanks in the present instance are the same length and are long enough to surround the mandrel on which they are wound in substantially two coils or convolutions, and the blanks B are slightly wider than the blanks A in order to furnish sufficient overhang of the blanks B to provide for the seating and confining of the bottoms of the cartons.

The blank holders and their associated blank extracting and blank feeding mechanisms are the same, except in one minor particular, for the two blanks A and B and a detailed description of one mechanism, that for handling the blanks A will suffice for an understanding of the other, the corresponding parts of which have like reference numerals applied.

Figure 9:
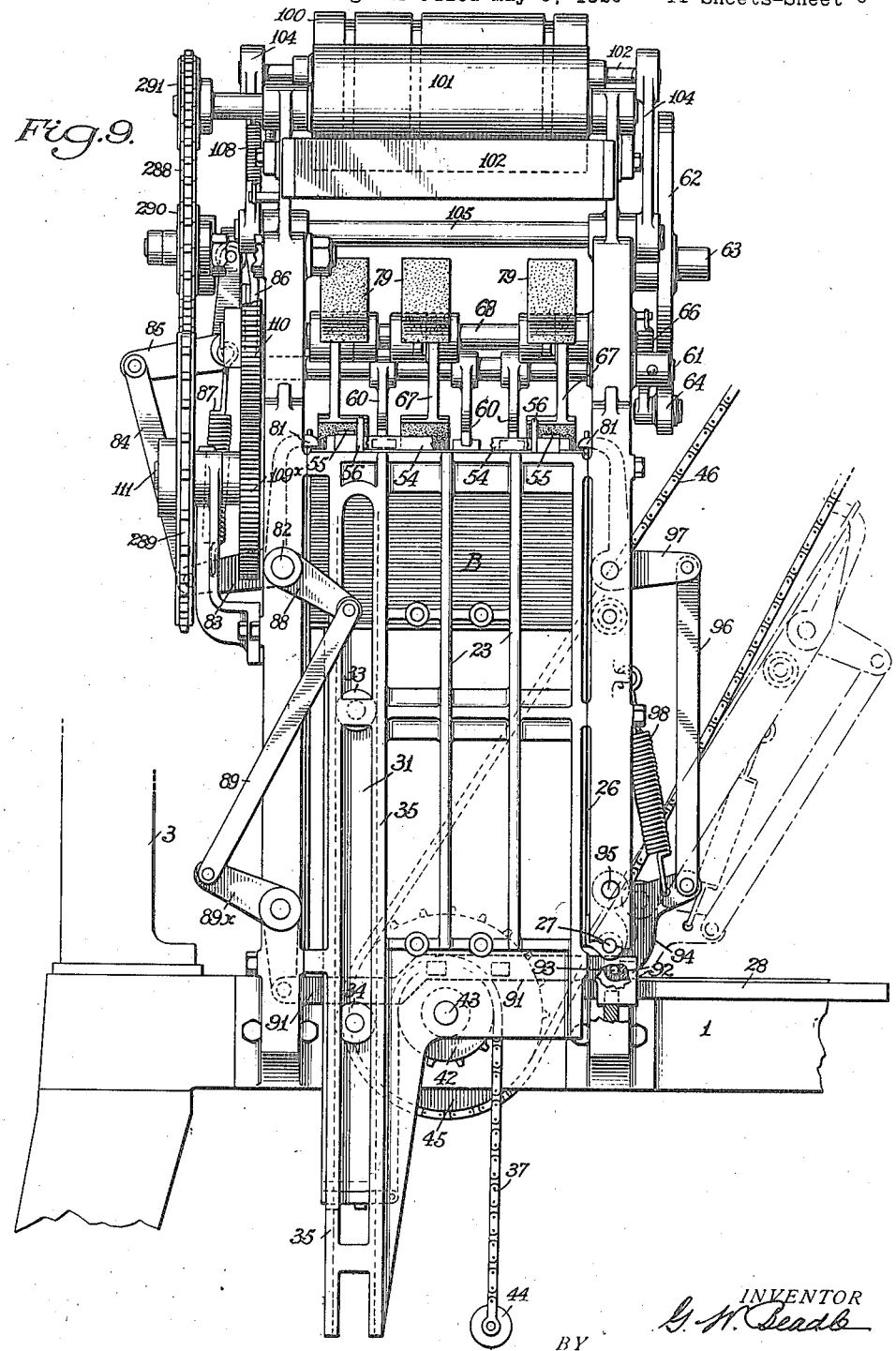
Fig. 9 is an end elevation of the machine as viewed from the right in Fig. 1.
Figure 15:
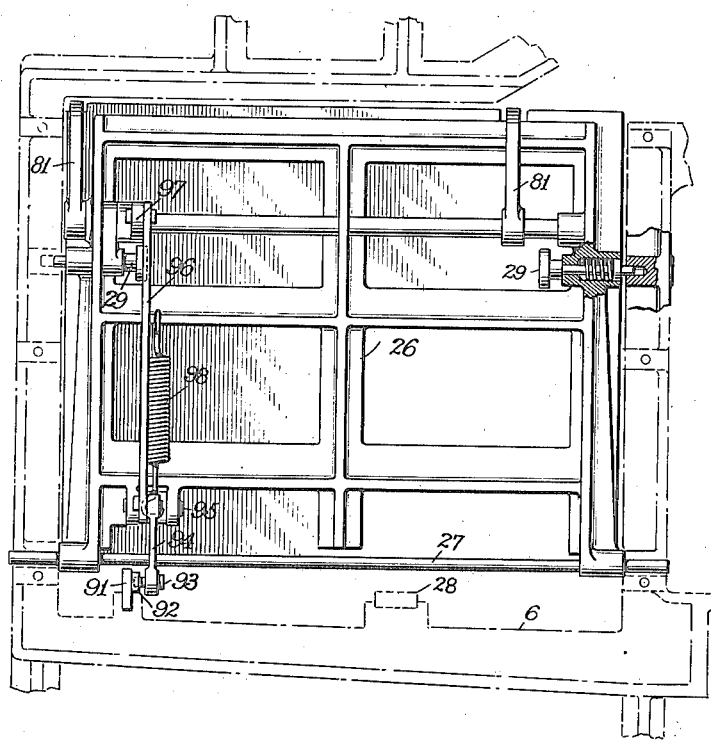
Fig. 15 is a fragmentary view of the hinged door for the blank holder, and the blank retaining fingers carried by said door.

The blank holder 5, see Figs. 2, 8 and 9 is in the form of an upright box or receptacle open at its top and bottom and comprising outer and inner end walls 23 and 24 of skeleton-like formation, a permanent front side wall 25, and a movable rear side wall or door 26, which latter is connected at its lower end to a hinge rod 27 mounted at its ends in bearings in the end walls of the holder, so that the side wall can be swung down as shown by dotted lines in Fig. 9, to open the holder and permit of the introduction of the blanks, in which position it will be supported by a horizontal bar 28 fastened to the framing of the holder and projecting rearwardly therefrom as shown at Fig. 8. This hinged wall thus forms a side door for the holder and it is releasably locked in vertical closed position by means of two spring actuated locking bolts 29 mounted in the ends of the door and adapted to engage in sockets in the end walls of the holder, as shown at Fig. 15.

The blanks A rest on a horizontal follower or plate 30 which fits slidingly between the walls of the holder so that it may be moved up and down freely therein, and this plate has fixed to it at the side next the permanent wall, two depending arms, an inner one 31 and an outer one 32 (see Figs. 1 and 2), on which are journalled upper and lower rollers 33 and 34. The inner rollers travel in a vertical guideway 35, Fig. 12 formed in the inner wall of the holder, while the outer rollers travel in a similar guideway 36 in the outer wall of the holder. The follower is urged upwardly by means of sprocket chains 37 and 38, which are connected at one of their ends to the lower ends of the two arms 31 and 32 respectively, and pass upwardly therefrom and around sprocket wheels 41 and 42, fixed to a horizontal shaft 43, which is journalled in bearings in the inner and outer end walls of the holder near their lower ends, the free ends of the two chains hanging from the sprocket wheels and having connected with them a weighted bar 44. At its inner end the shaft 43 carries a sprocket wheel 45 around which passes an endless sprocket chain 46 which extends upwardly and passes around a sprocket wheel 47 (Figs. 13 and 14). This sprocket wheel is fixed to one end of a shaft 48 mounted in a bearing 49 on a bracket arm 50 extending upwardly from the rear frame member 4, the other end of the shaft having fixed to it a fusee wheel 51, to which is connected a cord or cable 52 having a counterweight 53 attached to it. The weight tends to unwind the wheel and turn it in a clockwise direction (Fig. 13), and this action will, through the medium of the chain 46, shaft 43, the sprocket wheels thereon, and chains 37 and 38, operate to elevate the follower plate in the holder. The fusee wheel tends to equalize the elevating force applied to the follower plate notwithstanding the decreasing weight of the pile of blanks due to the successive feed of the blanks from the top of the pile in the operation of the machine, the leverage of the cable on the wheel decreasing as the same unwinds, to correspond to the decreasing weight of the pile of blanks as the follower moves up. The purpose in providing the weighted bar 44 is to obtain sufficient counterbalance on the follower to support it when fully loaded, which action could not be secured by the weight 53 without the latter being of unduly large size.

The topmost blank in the blank holder extends normally at its outer edge beneath a blank holding device in the form of a crossbar 54, Figs. 1, 2 and 8 fixed to the inner ends of two spring fingers 55, whose outer ends are fastened to the outer wall 23 of the holder. Two stop fingers 56 are pivoted at their outer ends as at 57 to the wall 23 of the holder, and are provided with depending stop lugs 58 which normally rest on the topmost blank near its outer edge, and inward of these lugs the fingers have extensions 59 which are spaced a slight distance above the surface of the blank. At its inner edge, the blank is acted on by a number of fingers 60 constituting a blank presser device which fingers normally press down on and hold the sheet at this point, but which at the proper times are raised to release the blank. These fingers 60 are carried by a rock shaft 61, and are raised at the proper time by means of a cam wheel 62 on the end of a shaft 63, which cam acts on a roller 64 on an arm 65 fixed to the end of the rock shaft 61. The arm is acted on by a spiral spring 66 which holds the roller against the cam wheel and lifts the presser fingers when the lower part of the cam engages the roller.

The blank held by the several devices described is acted on by a gang of rotary blank flexing fingers 67 constituting a blank flexing member, which fingers are fixedly connected to a horizontal rotary shaft 68 mounted in suitable bearings in the framework of the blank holder and located some distance above the open end of the holder, the said fingers having their active ends provided with gripping surfaces, preferably in the form of rubber facings or pads. These flexing fingers as they sweep around in their rotation, will engage the surface of the blank and will flex the same, as shown in Fig. 2, thereby withdrawing the outer edge of the blank from beneath the cross-bar 54 and the stop lugs 58 of the stop fingers 56, the opposite end of the blank being held during this action by the presser fingers 60. On the continued movement of the flexing fingers, they will disengage the blank (see Fig. 3), and the tendency of the flexed portion of the blank to straighten out will cause its outer end to bring up against the stop lugs 58, this position of the blank being shown in Fig. 3. At the moment that the flexing fingers disengage the blank, the presser fingers 60 are lifted from engagement with the same by the action of the cam wheel 62 and spring 66, and the blank being released with its outer end abutting against the stop lugs 58 and with the flexure therein, the latter in straightening out will thrust the inner end of the blank to the right beneath a spring finger 70 constituting one terminal of a normally closed electric circuit 71, Figs. 6 and 7, the other terminal of which is constituted by a finger 72, the effect of the thrust of the blank between the two terminals being to break the normally closed circuit. This circuit through the medium of suitable electromagnets 73 included therein, as shown in Figs. 2 and 6, controls a presser roller 74 which is journalled in the ends of two arms carried by a rock shaft 75. An arm 75$^b$ is connected to one end of the rock shaft and has fixed to it a weight 75$^c$, and a link 75$^d$ is pivoted at its upper end to the arm and is pivoted at its lower end to an armature lever 75$^e$, which in turn is pivoted to a bracket 75$^f$ sustained by the machine frame adjacent the magnet. Normally, with the circuit closed, the roller 74 is held by the magnet free from engagement with the surface of a feeding drum 76 carried by the shaft 63, but when the end of the blank is thrust forward as above described, and breaks the circuit, the weight 75$^c$ acting on the shaft 75 will rock the same and lift the roller into engagement with the drum.

The shaft 68 before alluded to as carrying the flexing fingers, has fixed to it a gang of blank advancing fingers 78, which follow in the wake of the flexing fingers, and like the flexing fingers they are provided on their active ends with blank gripping facings 79. At the moment that the presser fingers 60 release the sheet and the latter thrusts forward and breaks the circuit, these advancing fingers come around and engage the released blank and advance the same and enter its inner edge in the bite of the presser roller 74 and a feeding drum 76, and as the drum rotates, the blank will be fed forward between it and the roller, and passing through a horizontal guide 80, it will be presented to the forming mandrel at position 1$^z$, where it will be wound upon the mandrel by the first winding mechanism constituted by the opposed winding rollers 112, 113 between which the mandrel is for the time being positioned.

Just previous to the moment that the blank is flexed by the flexing fingers as above described, blank retaining fingers 81, which before had been thrust inwardly from opposite sides of the holder and were engaging and holding the topmost blank down, are moved outwardly so as to release the blank and permit it to be flexed and fed forward. These fingers are shown best in Figs. 8, 9 and 10, there being two pairs arranged on opposite sides of the holder respectively, adjacent its opposite ends. After moving outwardly to permit the blank to be flexed, they immediately move back so as to engage the next blank beneath and prevent this from being displaced or fed forward with the first blank. The fingers at the rear side of the holder, Fig. 10, are mounted fixedly on a horizontal rock shaft 81$^x$, journalled in bearings carried by the holder door 26, while those at the opposite side of the holder are mounted on a horizontal rock shaft 82 journalled in bearings on the holder frame. The rock shaft 82 has fixed to it an arm 83 which is connected by means of a link 84 with a bell crank lever 85, the upper arm of the lever having a roller which is engaged by a rotary cam 86 fixed to the shaft 63 of the blank feeding drum, by which means the bell crank lever will be rocked to actuate the retaining fingers. The arm 83 is acted on by a spring 87 connected with a fixed part of the holder frame, the spring tending to pull up on the arm and thereby maintain the roller in contact with the cam and urge the retaining fingers inwardly on the blank. The rock shaft 82 is connected by intermediate connections with the opposite rock shaft 81$^x$ in order that both sets of retaining fingers on the opposite sides of the holder will be moved outwardly and inwardly in unison.

These connecting parts consist of an arm 88 on the end of the rock shaft 82, to which arm is pivoted the upper end of a link 89, the lower end of which is pivoted to an arm 89ˣ carried by a rock shaft 90ª mounted on the framing of the holder. This shaft has another arm 89ʸ which is pivoted to a horizontal rod 91 which extends therefrom beneath the holder to the opposite side of the same, at which point it is provided with a lug 92. This lug is adapted to engage a pin 93 (93ª) on one arm of a bell crank 94 carried by a rock shaft 95 mounted on the hinged door of the holder. The other arm of the bell crank is pivoted to a link 96 which is in turn pivoted to an arm 97 on the rock shaft 81ˣ. The bell crank 94 is acted on by a spring 98 which tends to rock it so as to thrust the link 96 upwardly and thereby rock the shaft 81ˣ and swing the retaining fingers inwardly. In the position of the parts shown in Fig. 10, the roller on the bell crank lever 85 is engaging the low surface of the cam 86, and the lug 92 on rod 91 is engaging pin 93 on the bell crank 94, and the springs 87 and 98 are holding the parts with the retaining fingers extending inwardly and engaging the topmost blank. When now the cam 86 is rotated and the high part engages with the roller, the rock shaft 82 will be rocked, and rod 91 will be pulled to the left, this action, due to the engagement of lug 92 with pin 93, rocking bell crank 94 and correspondingly rocking rock shaft 81ˣ, the rocking motions of the shafts 81ˣ and 82 being in a direction to swing the retaining fingers outwardly free of the blank. The parts are so timed that the cam will engage the roller and thus swing the retaining fingers outwardly at the moment that the flexing fingers engage the blank and flex it, and the retaining fingers immediately swing back under the influence of the springs 87 and 98, just as soon as the flexed portion of the blank rises free of the path of the fingers, the result being that the second blank will be retained from displacement when the first blank is advanced from the holder. The reason for having the rod 91 disconnected from the bell crank lever 94 as distinguished from pivoting the same thereto, is because of the fact that the shaft 81ˣ and bell crank 94 are mounted on the hinged door of the holder. This door can be swung outwardly to open position, as shown by dotted lines in Fig. 9, in order to permit the blanks to be placed in the holder, and by having the rod 91 and bell crank disconnected, this swinging motion of the door is permitted, the pin 93 on bell crank 94 in this swinging movement shifting to the left free of the lug 92 on rod 91.

Figure 16:
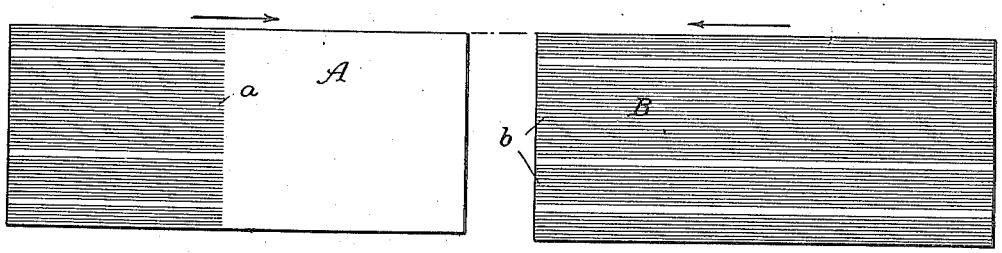
Fig. 16 is a view of the two blanks employed in forming the cartons, showing at the left the first blank with a portion of its surface coated with adhesive, and at the right the second blank wholly coated with adhesive.

As the blank is fed forwardly by the feeding drum 76 and cooperating presser roller 74 a suitable adhesive is applied to the second half of the blank as shown at $a$ in Fig. 16, by means of a raised segmental adhesive applying surface 99 on the drum which extends beyond the periphery of the drum and circumferentially thereof for a distance only sufficient to apply the adhesive to the last half of the blank as shown at $a$ Fig. 16. The adhesive is applied to the surface 99 by a transfer roller 100 which engages a master roller 101 immersed in a pan 102ˣ of adhesive. The roller 100 is supported a slight distance from the main lower surface of the drum, so that when the raised adhesive applying surface passes it, the latter will engage said surface and transfer the adhesive to the same, and by means of this surface the adhesive will be applied to the blank. The parts are so timed in their movements that during the first portion of the feed of the blank between the feeding drum and presser roller, the low surface of the drum will contact with the blank, but during the remaining portion of the feed of the blank, the raised adhesive applying surface will engage the blank and will apply the adhesive to the last half only of the same.

The roller 100 is rotatably mounted on a shaft 102 provided on its ends with flattened studs which extend loosely in radial slots 103 in the outer ends of arms 104 whose inner ends are fixed to a rod 105 carried by the holder frame. The roller 101 is acted on by a doctor knife 106 (see Figs. 2 and 11), which is mounted in a frame 107 pivoted to brackets fixed to the sides of the adhesive pan so that the knife may be adjusted to and from the periphery of the roller. This adjustment is effected by means of an adjusting screw 109 screwed through the frame 107 and bearing at its end against one of the bracket plates, a spring 108 being connected respectively with the frame 107 and machine frame, and tending to pull the frame downwardly on its axis and cause the edge of the doctor knife to approach the surface of the roller. By turning the adjusting screw, the knife frame may be swung upwardly on its axis which will carry the doctor knife further away from the surface of the roller.

The shaft 68 carrying the flexing fingers and the advancing fingers before alluded to, is driven in such manner that the flexing fingers will approach and engage the blank with a comparatively slow motion to flex the same, and the advancing fingers will be accelerated in their motion and will engage and advance the blank with a comparatively rapid motion. In the present instance, this is effected by the two eccentrically mounted spur pinions 109ˣ and 110, the pinion 109ˣ being a driving pinion and mounted on a rotary shaft 111, and the pinion 110 being a driven pinion and mounted on the shaft 68. These pinions are so mounted on their respective shafts relatively to each other that as the flexing fingers sweep down to engage the blank to flex it, the short radius of the pinion 109ˣ will be in line with the long radius of the other pinion. Consequently this latter pinion will be driven at slow speed. But when the advancing fingers sweep down to engage the blank and feed it as shown in Fig. 4, the long radius of the driving pinion will be in line with the short radius of the driven pinion and the latter will be driven at higher speed.

In the mechanisms operating on the blanks as above described, the several members which act on the topmost blanks in succession to temporarily hold them in place, together with the blank flexing fingers 67 and the blank advancing fingers 78 and their associated operating parts, constitute a blank extracting mechanism; and the feeding drum 76 and its cooperating presser roller 74 and their associated operating parts constitute a blank feeding mechanism; the function of the extracting mechanism being to separate the topmost blanks in succession from the pile and advance the same to the action of the feeding mechanism, and the function of the latter being to feed the advanced blanks to the action of the blank winding mechanism.

While the blank is being drawn by the feeding mechanism between the terminal fingers of the electric circuit, the circuit as before stated will be open and the presser roller 74 will press the blank against the feeding drum and adhesive applying surface; but when the rear end of the blank passes from between the terminals, the latter coming together and contacting with each other will close the circuit and the magnet will move the roller away from the drum. The parts are so arranged relatively and timed in their actions that the circuit will be thus broken and the roller moved away from the drum just before the rear end of the adhesive applying surface reaches the rear end of the blank. Consequently there will be no liability of the adhesive being squeezed out between the end of the surface and blank and being transferred to the presser roller and surface of the drum. The effect therefore of the electrically operated means controlling the presser roller, is to cause the presser roller to move up to the drum in operative relation to the same as the front end of the blank approaches the bite of the roller and drum, and to cause the roller to move away from the drum just before the rear end of the blank reaches the bite of the roller and drum, the blank in its forward movement effecting these operations automatically through the medium of a circuit controller constituted by the terminal fingers of the electric circuit.

The blank fed by the feeding drum through the guideway 80 will have its end presented to the mandrel, for the time being positioned at the end of the guideway, at which point the blank will be wound on the mandrel by the first winding mechanism before referred to, the first portion of the blank, that free of adhesive, making the first convolution in contact with the surface of the mandrel, and the second portion of the blank, that the adhesive coating applied, making the second convolution in contact with the first and adhering firmly to the same.

In this connection it is to be noted that the relation of the blank feeding mechanism to the blank winding mechanism, and the length of the individual blanks is such that the blank will be acted on and positively advanced by the winding mechanism before it is disengaged by the feeding mechanism and before the rear end of the blank passes from between the terminals of the electric circuit. As a result there will be no interruption in the advance of the blank, when on the closure of the circuit, the presser roller 74 is moved away from the feeding drum 76.

The feeding drum for acting on blanks B at the right end of the machine is the same as that just described with the exception that the segmental adhesive applying surface on the right hand drum is of a length to apply the adhesive material to the entire surface of the blank B as shown at $b$ Fig. 16. When in the operation of the machine, therefore, blank B is presented to and wound around the previously coiled blank A by the second winding mechanism as the mandrel with blank A on it reaches a position between the rolls of the second winding mechanism the convolutions of blank B will be cemented to blank A and the two will be caused to adhere to each other firmly so as to form the cylindrical body of the carton.

The flexing fingers, advancing fingers, and the blank feeding mechanisms for the two sets of blanks are operated in unison with each other from the main driving shaft 127 of the machine through the medium of two horizontal transverse shafts 286 which are mounted in suitable bearings beneath the drums 76 respectively, and as the driving devices operated by these two shafts are the same for the feeding mechanism at both ends of the machine, a description of one will suffice. At one end the shaft 286 has fixed to it a sprocket wheel 287 Fig. 8 around which passes a sprocket chain 288 which also passes around the upper side of a sprocket wheel 289 on shaft 111, over an idler sprocket wheel 290, over a sprocket wheel 291 on the adhesive distributing roller 100, and over a sprocket wheel 292 on the drum 76, whereby all of these parts are rotated in a direction to cause them to operate in the manner hereinbefore described, it being understood that similar driving devices for the other set of mechanisms are similarly operated by the sprocket wheel on the end of the other shaft 286, so that the blanks from the two holders 5 and 6 will be fed to the positioned mandrels in unison with each other.

In the foregoing description and accompanying drawings, I have set forth my invention in a certain detailed form and construction, but it will be manifest that these details may be variously modified and changed without departing from the limits of the invention; and further, it will be understood that the invention is not limited to any particular form or construction of the parts, except in so far as such limitations are specified in the claims.

Having thus described my invention, what I claim is:

1. In a machine of the type described, the combination of mechanism for feeding blanks, said mechanism including a feeding drum having a segmental adhesive-applying surface of a length to apply adhesive to a portion only of the blank, means for supplying adhesive to said surface, the said blank being adapted to be wound about a mandrel with the adhesive free portion next to the surface of the mandrel, and a second blank feeding mechanism for feeding a second blank, said mechanism including a feeding drum provided with a segmental adhesive-applying surface of a length to apply adhesive to the entire surface of the second blank, the said second blank being adapted to be wound around the first.

2. In a machine of the type described, the combination of mechanism for feeding blanks in succession, said mechanism including a rotary feeding drum provided with a segmental adhesive-applying surface, and a device for advancing the blanks in succession to the action of the feeding drum, the said device being so timed in its action relative to the rotation of the drum that the adhesive-applying surface will act on the rear portion only of the blanks and apply adhesive thereto.

3. In a machine of the type described, the combination of mechanism for feeding blanks in succession, said mechanism including a rotary feeding drum provided with a segmental adhesive-applying surface, a device for advancing the blanks in succession to the action of the feeding drum, and means for operating said device in timed relation to the drum to cause the adhesive-applying surface to act on the rear portion only of the blanks in the successive rotations of the drum.

4. In a machine of the type described, the combination of blank feeding means including a feeding drum provided with a raised adhesive-applying surface, and a presser roller normally free of the drum and movable into operative relation to the same to press the blank against the drum and surface, together with means for advancing the blanks in succession to the action of the drum and roller, and means for periodically moving the roller away from the drum before the end of the blank reaches the roller; whereby the transfer of adhesive to the presser roller will be prevented.

5. In a machine of the type described, the combination of mechanism for feeding blanks, said mechanism including a rotary feeding drum provided with an adhesive-applying surface and a cooperating presser roller adapted to press the blank against the drum and said surface, means acting when the rear end of the paper approaches the bight of the roller and drum to move said roller away from the drum, whereby the adhesive will be prevented from being transferred to the roller.

6. In a machine of the type described, the combination of mechanism for feeding blanks, said mechanism including a rotary feeding drum provided with an adhesive-applying surface, and a cooperative presser roller adapted to press the blank against the drum and said surface, said roller being normally out of engagement with the drum, and means acting when the forward end of the blank approaches the bight of the roller and drum, to move said roller into operative relation to the drum.

7. In a machine of the type described, the combination of mechanism for feeding blanks, said mechanism including a rotary feeding drum provided with an adhesive-applying surface, a presser roller cooperating with the drum to force the blank against the same and said surface, a device for advancing the blank to the feeding action of the drum and roller, a normally closed electric circuit, an electro-magnet included in said circuit and acting on the presser roller to hold the same free of the feeding drum, said circuit being adapted to be broken by the forward end of the blank as it is advanced, and means acting on the roller to move the same into operative relation to the feeding drum when the circuit is broken.

8. In a machine of the type described, the combination of mechanism for feeding blanks including a rotary feeding drum provided with an adhesive-applying surface, and a presser roller cooperating therewith, a normally closed electric circuit including an electro-magnet whose armature is operatively connected with the presser roller to hold it away from the drum, a circuit controller in said circuit in position to be operated by the advancing blank to break the circuit, and means acting when the circuit is broken to move the presser roller up to the feeding drum.

9. In a machine of the type described, the combination of mechanism for feeding blanks, said mechanism including a rotary feeding drum provided with an adhesive-applying surface, a presser roller cooperating with the drum in pressing the blank against the same and said surface, a device for advancing the blank to the action of the drum and roller, a normally closed electric circuit having its terminals positioned to be separated by the forward end of the blank as it enters between said terminals in the advance of the blank, an electro-magnet included in said circuit and acting normally to hold the presser roller free of the feeding drum, and means acting on the roller to move the same into operative relation to the drum when the circuit is broken by the separation of the terminals.

10. In a machine of the type described, the combination of mechanism for feeding blanks including a rotary feeding drum provided with an adhesive-applying surface and a presser roller cooperating therewith to press the blank against the drum and surface, a normally closed electric circuit, an electro-magnet included in said circuit and acting on the roller to hold it away from the drum, the terminals of said circuit being in yielding engagement with each other and in such position that the advancing blank will enter between the terminals and separate them and thereby break the circuit, and means acting when the circuit is broken to move the presser roller into operative relation to the drum, said terminals acting when the blank passes from between them to automatically engage with each other and close the circuit; whereby the magnet will again move the presser roller free of the drum.

11. In a machine of the type described, the combination of a blank holder in which blanks are piled one upon the other, blank feeding means for advancing the blanks, said feeding means including a rotary feeding drum and a cooperating presser roller, an electro-magnet acting when energized to hold the roller free of the drum, means acting when the magnet is deenergized to move the roller into operative relation to the drum to press the blank against it, a normally closed electric circuit including said magnet, a circuit controller in said circuit, together with a blank extracting means operable on the topmost blank to cause its forward end to move towards the feeding means, said circuit controller being in position to be actuated by the blank to break the circuit; whereby the presser roller will be automatically positioned to cooperate with the feeding drum in feeding the blank.

12. In a machine of the type described, the combination of a blank feeding mechanism comprising cooperating parts movable relatively to each other to operative and inoperative positions respectively and adapted when in operative relation, to feed the blanks, an electro-magnet controlling the parts of the feeding mechanism, an electric circuit including said magnet, a circuit controller included in the circuit, a blank holder in which the blanks are piled one upon the other, and a blank extracting mechanism operating to move the blanks in succession towards the feeding mechanism, the said circuit controller being in position to be operated by the blanks in their movement.

13. In a machine of the type described, the combination of blank feeding mechanism for feeding the blanks, said mechanism including a rotary feeding drum and a cooperating roller normally free of the drum and movable into operative relation to the same to press the blank against the drum, an electro-magnet controlling the movements of the presser roller, an electric circuit including said magnet, and a circuit controller included in the circuit, together with a blank holder in which the blanks are piled one upon the other, and means for flexing the topmost blank preparatory to its advance to the feeding means, said circuit controller being in position to be actuated to control the circuit by the straightening out of the flexed blank.

14. In a machine of the type described, the combination of a blank holder in which the blanks are piled one upon the other, a presser device acting on the topmost blank at its front and holding it down on the blank beneath, a blank flexing member adapted to engage the blank and flex the same, a blank feeding mechanism including a feeding drum and a cooperating presser roller normally disengaged from the drum and movable into operative relation thereto to press the blank against the drum, an electro-magnet acting when energized to hold the roller away from the drum, a normally closed electric circuit including said magnet and provided with a circuit controller arranged in the path of the blank, means for operating the presser device to release the flexed blank, whereby the flexure in straightening out will thrust the end of the blank forward and operate the circuit controller and break the circuit thereby permitting the presser roller to be moved into operative relation to the drum, and a blank advancing member adapted to engage the released blank and advance it to the feeding action of the roller and drum.

In testimony whereof, I have affixed my signature hereto.

GEORGE W. BEADLE.